United States Patent [19]
Rodseth et al.

[11] Patent Number: 5,191,209
[45] Date of Patent: Mar. 2, 1993

[54] PHOTOELECTRIC SWITCH SEALED AGAINST INFILTRATION OF CONTAMINANTS

[75] Inventors: William G. Rodseth, Elgin; James W. Robinson, Mundelein, both of Ill.

[73] Assignee: Illinois Tool Works Inc., Glenview, Ill.

[21] Appl. No.: 716,215

[22] Filed: Jun. 17, 1991

[51] Int. Cl.⁵ ............................................. G01D 5/34
[52] U.S. Cl. ................................... 250/229; 341/31
[58] Field of Search .................... 250/229, 227.21; 341/31; 200/302.1, 302.2

[56] References Cited
U.S. PATENT DOCUMENTS
4,607,160 8/1986 Sakakino .................. 250/227.21

Primary Examiner—David C. Nelms
Assistant Examiner—K. P. Hantis
Attorney, Agent, or Firm—Schwartz & Weinrieb

[57] ABSTRACT

A photoelectric switch is sealed against the infiltration of contaminants, for example, oil mist within a combustion-powered tool comprising a switch. In a housing structure sealed by an O-ring when assembled, two photoelectric devices define a line of sight therebetween. A plunger is biased to an inoperative position, in which a shutter portion thereof blocks the line of sight. In an operative position, the shutter portion unblocks the line of sight. The plunger has a stem portion sealed by another O-ring. Where electrical leads from the devices extend through apertures defined within the back member, the apertures are sealed by solder used to connect leads to copper layers, which may be screen-printed upon an outer surface of the back member. A cap mounted upon the back member covers the contacts and admits electrical wires soldered to the layers.

20 Claims, 4 Drawing Sheets

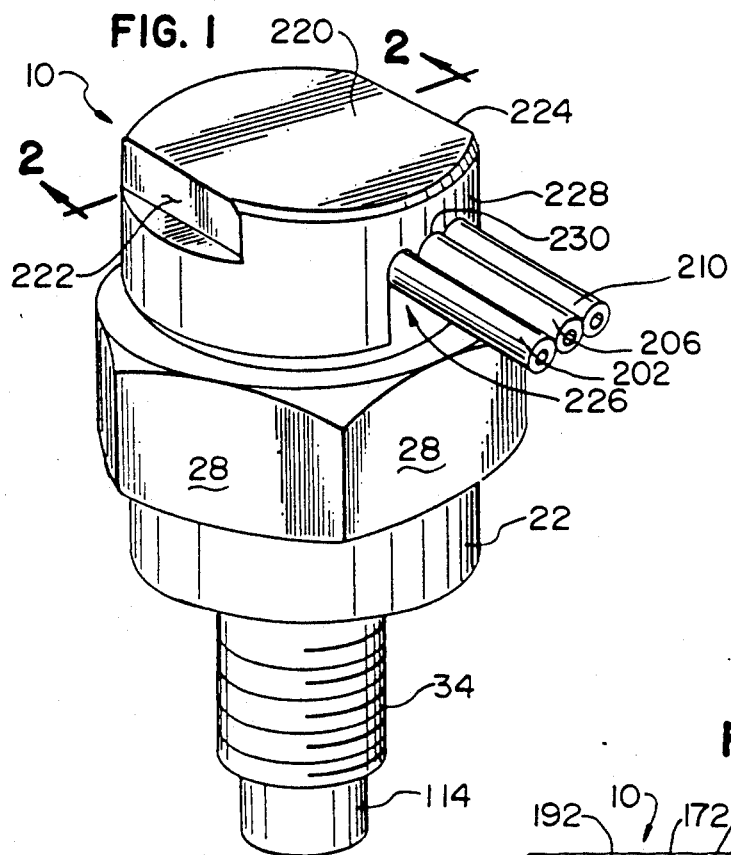
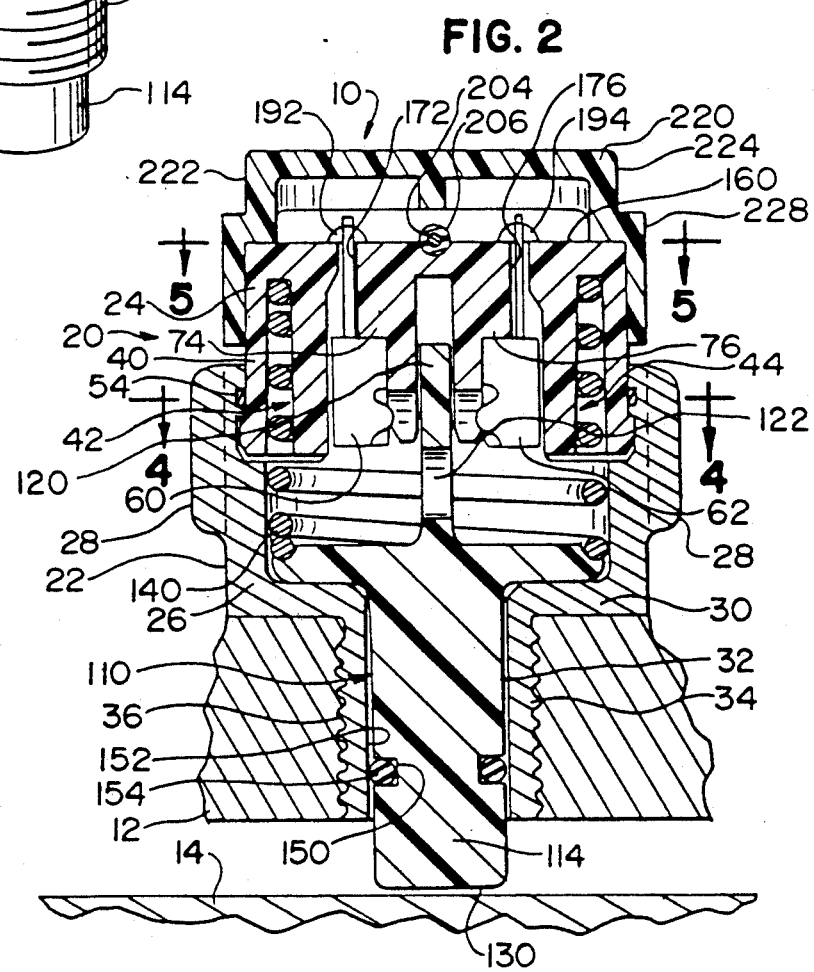

PHOTOELECTRIC SWITCH SEALED AGAINST INFILTRATION OF CONTAMINANTS

TECHNICAL FIELD OF THE INVENTION

This invention pertains to a plunger-actuated, photoelectric switch, which is sealed against the infiltration of contaminants that could interfere with its proper operation. Thus, this invention can be advantageously used within a combustion-powered tool, in which oil mist, combustion products, or both are pervasive.

BACKGROUND OF THE INVENTION

In a combustion-powered tool, such as, for example a fastener-driving tool of a type exemplified in Nikolich U.S. Pat. Nos. 4,403,722, 4,483,474, and Re. 32,452, it is known to add a lubricating oil to a hydrocarbon fuel, which combust so as to drive the tool. As exemplified in these patents, electromechanical switches are used within such tools. Although photoelectric switches of the type wherein a shutter is used to selectively block and unblock a line of sight defined between a phototransmissive device and a photoreceptive device would be more reliable within such a tool, in which shocks and vibrations tend to be frequently encountered, it has not been known heretofore to use such photoelectric switches within such tools.

Within such a tool, oil mist, combustion products, or both are pervasive and would militate against the usage of photoelectric switches of the type noted above, since the infiltration of oil mist or other contaminants would tend to interfere with the proper operation of such a switch. There has been a need, to which this invention is addressed, for a photoelectric switch of the type noted above that is sealed against the infiltration of contaminants, such as, for example oil mist, which could interfere with its proper operation.

SUMMARY OF THE INVENTION

This invention provides a photoelectric switch that can be advantageously used within a combustion-powered tool, such as, for example, a fastener-driving tool of the type mentioned above, because the switch is sealed against the infiltration of contaminants, such as, for example, oil mist and combustion products. Although the switch was developed specifically for such a tool, it is contemplated that such a switch may have a wide variety of other uses.

Broadly, the switch comprises a housing structure having a hollow interior, photoelectric switching means mounted within the hollow interior so as to define a line of sight, and a plunger having a shutter portion and an actuating portion. The shutter portion is moveably disposed within in the hollow interior. The plunger is moveable by means of the actuating portion between an operative position wherein the shutter portion does not block the line of sight and an inoperative position wherein the shutter portion blocks the line of sight.

A practical construction that may be advantageously used as a head switch for a fastener-driving tool is contemplated wherein the switch comprises a housing structure, which includes a front member with a tubular wall and a back member with a tubular wall. The tubular walls are configured so as to enable the tubular wall of the back member to be mechanically connected to the tubular wall of the front member. The housing structure has a hollow interior, which is defined by means of the front and back members. The front member has a tubular extension, which communicates with the hollow interior. At the tubular walls, the switch is sealed against the infiltration of contaminants.

In the aforenoted construction, two photoelectric devices are mounted within the hollow interior, namely a phototransmissive device, such as, for example, a light-emitting diode, and a photoreceptive device, such as, for example, a light-sensitive transistor. The photoreceptive device is mounted in spaced relation with respect to the phototransmissive device. The photoelectric devices define a line of sight therebetween.

Moreover, in the aforenoted construction, the switch includes a plunger having a shutter portion extending in one direction and a stem portion extending in the opposite direction. The shutter portion is moveably disposed within the hollow interior. The stem portion extends through the tubular extension. The plunger is moveable between an operative or switching position and an inoperative position, to which it is biased. A distal end of the plunger is extends from the tubular extension in the operative and inoperative positions of the plunger. Around the stem portion, the switch is sealed against the infiltration of contaminants.

In the operative or switching position, the shutter portion does not block the line of sight. In the inoperative position, the shutter portion blocks the line of sight.

Preferably, the tubular walls of the front and back members are configured so as to enable the tubular wall of one such member to be snap-fitted into the tubular wall of the other member, and so as to define an annular recess, in which an O-ring is confined for sealing the switch at the tubular walls. Preferably, the stem portion and the tubular extension define an annular recess, in which an O-ring is confined for sealing the switch around the stem portion.

In a preferred arrangement, the stem portion has an annular recess and the tubular extension has a cylindrical surface surrounding the annular recess. Thus, in the preferred arrangement, the O-ring confined within the annular recess is moveable with the stem portion relative to the tubular extension.

In a preferred construction, the back member is made from an electrically insulative material, such as, for example, an engineering polymer. In addition, an outer surface of the back member has a plurality of electrical contacts, such as, for example, copper layers printed thereon, which are fixed upon the outer surface in spaced relation with respect to each other. Moreover, the outer surface has two pairs of small apertures leading to the hollow interior, namely one pair for each one of the photoelectric devices. Furthermore, each one of the photoelectric devices has a pair of electrical leads, which extend through the respective apertures of the associated pair. Each lead is soldered to one such contact with electrically conductive solder, which seals the aperture around such lead against the infiltration of contaminants.

Preferably, in the preferred construction, a plurality of electrically conductive wires are provided, each wire being connected electrically to one such contact, as by electrically conductive solder. Preferably, moreover, a cap mounted upon the back member is configured so as to cover the contacts disposed upon the back surface of the back member, and so as to admit the respective wires and provide strain relief for the respective wires.

Advantageously, if the tubular walls are configured so as to enable the tubular wall of one such member to be snap-fitted into the tubular wall of the other member. rotational adjustment is permitted. Specifically, rotational adjustment of the back member, the photoelectric devices, the biasing means, and the plunger (along with the cap, if used, and the respective wires, if used) relative to the front member is permitted. It is possible, therefore, for the front member to be fixedly mounted upon another structure and for other elements of the switch to be rotatably adjusted so as to meet space limitations and to facilitate external connections.

Because the switch is sealed against the infiltration of contaminants, the switch can be advantageously substituted for an electromechanical switch in an environment where contaminants are present, such as, for example, oil mist, combustion products, or both, which could interfere with the proper operation of the switch if it were not sealed.

BRIEF DESCRIPTION OF THE DRAWINGS

These and other objects, features, and advantages of this invention will become evident from the following description of a preferred embodiment of this invention with reference to the accompanying drawings, in which like reference characters designate like or corresponding parts throughout the several views, and wherein:

FIG. 1 is a perspective view of a photoelectric switch embodying this invention.

FIG. 2 is a cross-sectional view taken substantially in a vertical plane comprising line 2—2 of FIG. 1, in a direction indicated by means of the arrows, with the switch mounted upon another structure and with a plunger of the switch in an inoperative position.

DETAILED DESCRIPTION OF PREFERRED EMBODIMENT

Figure 3:
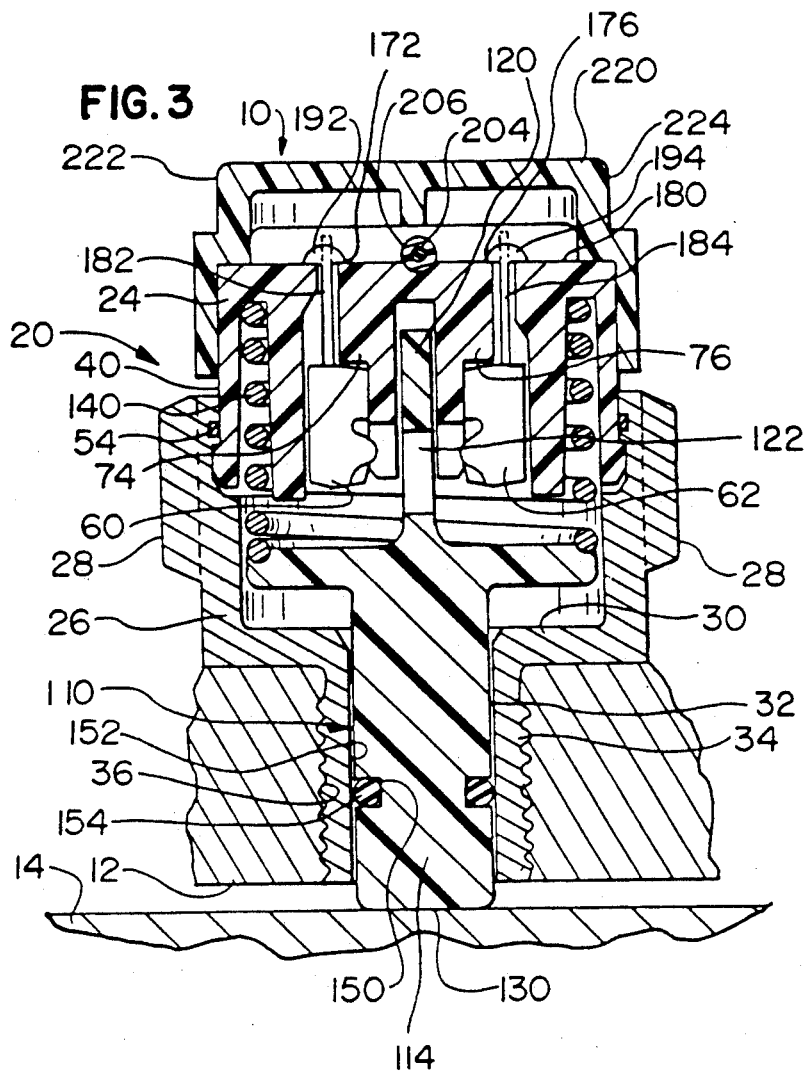
FIG. 3 is a cross-sectional view taken similarly as was FIG. 2 but with the plunger in an operative position.
Figure 4:
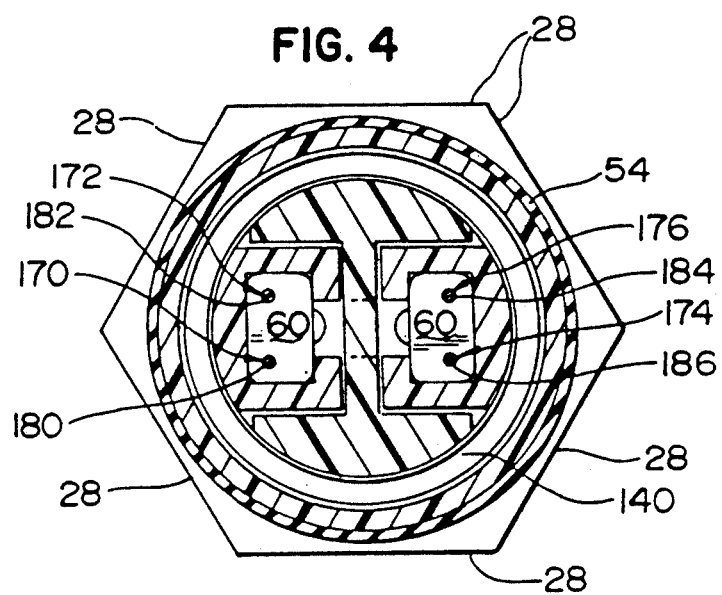
FIG. 4 is a cross-sectional view taken substantially along line 4—4 of FIG. 2, in a direction indicated by means of the arrows.

As shown in the drawings, a photoelectric switch 10 constitutes a preferred embodiment of this invention. The switch 10 is sealed, in a manner to be hereinafter described, against the infiltration of contaminants, such as, for example, oil mist, combustion products, or both, so that the switch 10 can be advantageously used as a so-called "head switch" within a fastener-driving tool of the type discussed above. Typically, the tool includes a moveable, work-contacting element, which actuates the head switch so as to permit firing the tool only when the element is in firm contact with the surface into which the fastener is to be driven. In FIGS. 2 and 3, the switch 10 is shown as being attached to a wall 12 of such a tool and is disposed above a work-contacting element 14 of the tool. Herein, directional terms, such as, for example, "upper", "lower", "front", and "back", and terms of similar import, are used merely to refer to the components of the switch 10 in a convenient orientation, in which the switch 10 is shown in the drawings, and not to limit the switch 10 to any particular orientation.

The switch 10 comprises a housing structure 20, which includes a front member 22 and a back member 24, which has a hollow interior defined by means of these members 22, 24, and which defines an axis. Preferably, the front member 22 is machined from 416 stainless steel, hex bar stock. Preferably, the back member 24 is molded from an engineering polymer, which is electrically insulative, such as, for example, ULTEM TM 2300 polyetherimide available commercially from GE Plastics, Pittsfield, Mass. These members 22, 24, are assembled in a manner described below.

The front member 22 is machined so as to be cup-shaped with a tubular wall 26, which has a substantially hexagonal configuration defining wrench-engaging flats 28 along a portion of the tubular wall 26, and with an annular wall 30, which has a circular aperture 32 and which also has a tubular extension 34 communicating with the hollow interior by means of the circular aperture 32. The tubular extension 34 is threaded externally so as to permit the tubular extension 34 to be threaded into an internally threaded aperture 36 defined within the wall 12 of the fastener-driving tool (not shown otherwise) employing the switch 10 as a head switch, so as upon mount the front member 22 to the wall 12. The wrench-engaging flats 28 facilitate mounting the front member 22 upon the wall 12 before or after the switch 10 is assembled.

The back member 24 is molded so as to have a tubular wall 40, two inner structures 42, 44, each of which is spaced inwardly from the tubular wall 40 in a radial sense, and other features described below.

Figure 7:
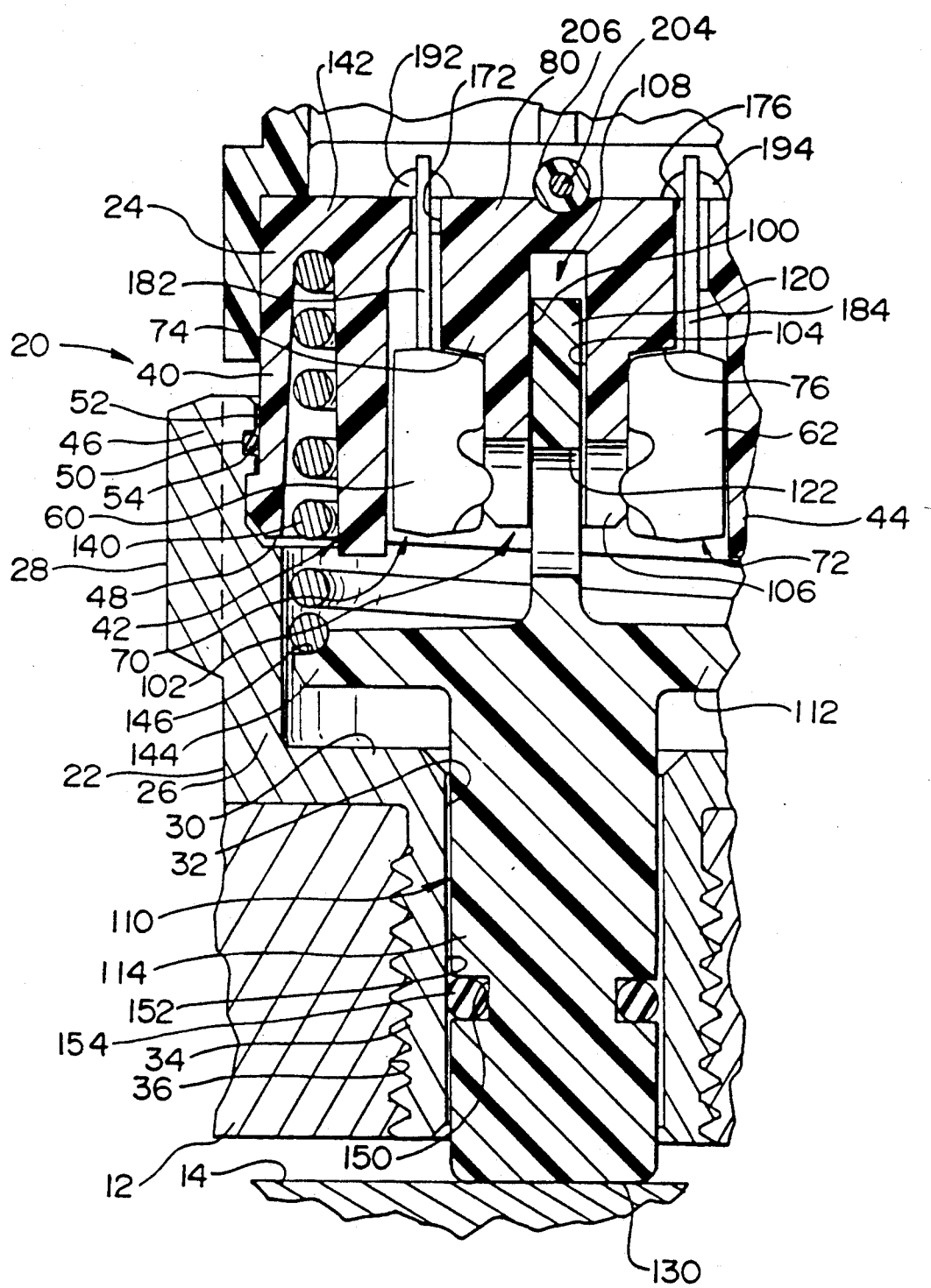
FIG. 7 is a greatly enlarged view similar to that of FIG. 3.

The tubular wall 26 of the front member 22 and the tubular wall 40 of the back member 24 have respective end configurations 46, 48, as best seen in FIG. 7, which enable the wall 40 to be snap-fitted into the wall 26, as shown in FIGS. 2 and 3. At the end configuration 46, the tubular wall 26 has an annular recess 50 (see FIG. 7). Where the wall 40 confronts the annular recess 50, the wall 40 has an outer, cylindrical surface 52. The annular recess 50 and the cylindrical surface 52 define a closed annular recess, in which an O-ring 54 is confined, whereby the O-ring 54 seals the switch 10 at the tubular walls 26, 40, against the infiltration of contaminants.

Within the hollow interior of the housing structure 20, two photoelectric devices are mounted, namely a phototransmissive device 60 and a photoreceptive device 62 which is mounted in spaced relation with respect to the phototransmissive device 60. The photoelectric devices 60, 62, define a line of sight therebetween. Preferably, the photoelectric devices 60, 62, are arranged in a known manner so that, when the line of sight therebetween is broken, the switch 10 is Off whereas, when the line of sight therebetween is unbroken, the switch 10 is On. The photoelectric devices 60, 62, may be alternatively arranged in a known manner so that, when the line of sight therebetween is broken, the switch 10 is On whereas, when the line of sight therebetween is unbroken, the switch 10 is Off.

As the phototransmissive device 60, which may also be called a photoemitter, it is preferred to use a light-emitting diode, such as, for example, an OMRON TM Model EE-L109 photoemitter available commercially from Omron Corporation, Schaumburg, Ill. As the photoreceptive device 62, which may also be called a photoreceptor, it is preferred to use a light-sensitive transistor, such as, for example, an OMRON TM Model EE-TP109 photoreceptor available commercially from Omron Corporation, supra. Other photoelectric devices performing similar functions may be alternatively used.

The back member 24 is molded so as to have, in the inner structure 42, a cavity 70 (see FIG. 7) accommodating the phototransmissive device 60 and so as to have, in the inner structure 44, a cavity 72 (see FIG. 7) accommodating the photoreceptive device 62. Within each cavity, a nub is formed, which positions the photoelectric device accommodated within and by such cavity. As shown in FIGS. 2, 3, and 7, such a nub 74 positions the phototransmissive device 60 in the cavity 70. Similarly, such a nub 76 positions the photoreceptive device 62 within the cavity 72.

The inner structures 42, 44, are similar to each other. The inner structure 42 has an inner wall 100 with a lower recess 102. The inner structure 44 has an inner wall 104 with a lower recess 106. The inner walls 100, 104, define a slot 108 therebetween. The slot 108, which has a limited depth, opens downwardly. The line of sight defined by means of the photoelectric devices 60, 62, passes from the phototransmissive device 60, through the lower recess 102, across the slot 108, through the lower recess 106, to the photoreceptive device 62.

Figure 6:
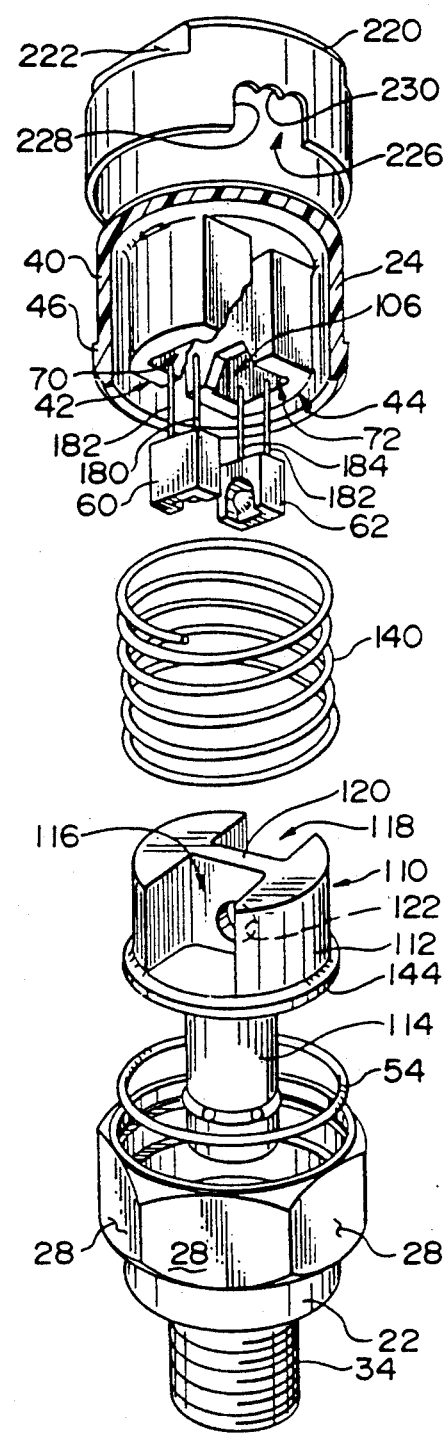
FIG. 6 is an exploded, perspective view of the switch.

The switch 10 comprises a plunger 110, which is molded from an engineering polymer, such as, for example DELRIN TM acetal available commercially from E.I Du Pont de Nemours & Co., Wilmington, Del. The plunger 110, which defines an axis coinciding with the axis defined by means of the housing structure 20, is molded so as to have a shutter portion 112 and a stem portion 114, which may also be called an actuating portion, and which extends axially from the shutter portion 112. The shutter portion 112 defines two cavities 116, 118, with a wall 120 therebetween, as best seen in FIG. 6. The wall 120 has an aperture 122. The shutter portion 112 is contained within the hollow interior of the housing structure 20 with sufficient clearance between the shutter portion 112 and the tubular wall 26 of the front member 22 so as to permit axial movement of the plunger 110 relative to the housing structure 20 over a limited range of such movement. The plunger 110 is shown in FIG. 2 at a lower limit of its limited range of axial movement and in FIGS. 3 and 7 at a position near an upper limit of its limited range of axial movement. At the lower limit, the shutter portion 112 bears against the annular wall 30 of the front member 22. At the upper limit, the plunger 110 engages the back member 24, as explained below. Thus, the plunger 110 is axially moveable between a narrow range of inoperative positions at or near the lower limit and a narrow range of operative positions at or near the upper limit.

Upon axial movement of the plunger 110 from the lower limit noted above toward the back member 24, the cavity 116 of the shutter portion 112 accommodates the inner structure 42, in which the phototransmissive device 60 is mounted, the cavity 118 of the shutter portion 112 accommodates the inner structure 44, in which the photoreceptive device 62 is mounted, and the slot 108 defined between the inner walls 100, 104, accommodates the wall 120 of the shutter portion 112. At the upper limit of the limited range of axial movement of the plunger 110, the plunger 110 engages the back member 24 at the wall 120, which cannot be further inserted into the slot 108 because of the limited depth of the slot 108. The wall 120 blocks the line of sight between the phototransmissive device 60 and the photoreceptive device 62 when the plunger 110 is at any one of its narrow range of inoperative positions at or near the lower limit of its limited range of axial movement. The aperture 122 is aligned with the recesses 102, 106, of the inner walls 100, 104, of the inner structures 42, 44, so as to unblock the line of sight between the photoelectric devices 60, 62, when the plunger 110 is disposed at any one of its narrow range of operative positions at or near the upper limit of its limited range of axial movement.

The stem portion 114 of the plunger 110 extends through the tubular extension 34 of the front member 22. A distal end 130 of the stem portion 114 extends outwardly from the tubular extension 34 over the entire range of axial movement of the plunger 110 relative to the housing structure 20 so as to extend therefrom in the operative and inoperative positions of the plunger 110. The distal end 130 is shown in FIG. 2 as being spaced above the work-contacting element 14 and in FIGS. 3 and 7 as being pressed axially inwardly by means of such element 14. If the switch 10 is used within a fastener-driving tool, as discussed above, the work-contacting element may be in contact with a wooden workpiece, into which a fastener (not shown) is to be driven by means of such tool. The switch 10 is used to actuate the tool when the distal end 130 is pressed axially inwardly by means of the work-contacting element 14 and to deactuate the tool otherwise.

A biasing spring 140, which is made from coiled music wire, is disposed within the tubular wall 40 of the back member 24, around the inner structures 42, 44, between an end portion 142 (see FIG. 7) of the back member 24 and an annular flange 144 formed upon the shutter portion 112 of the plunger 110, so as to bias the plunger toward its inoperative position at the lower limit of its limited range of axial movement. The annular flange 144 has a curved surface 146, against which the biasing spring 140 bears, and which tends to center such spring 140. The biasing spring 140 is compressible so as to permit axial movement of the plunger 110 toward its narrow range of operative positions.

The stem portion 114 of the plunger 110 has an annular recess 150. The tubular extension 34 of the front member 22 has a smooth, inner, cylindrical surface 152 surrounding the annular recess 150. An O-ring 154, which is confined within the annular recess 150, is moveable with the stem portion 114 relative to the tubular extension 34. The O-ring 154 seals the switch 10 around the stem portion 114 against the infiltration of contaminants.

Figure 5:
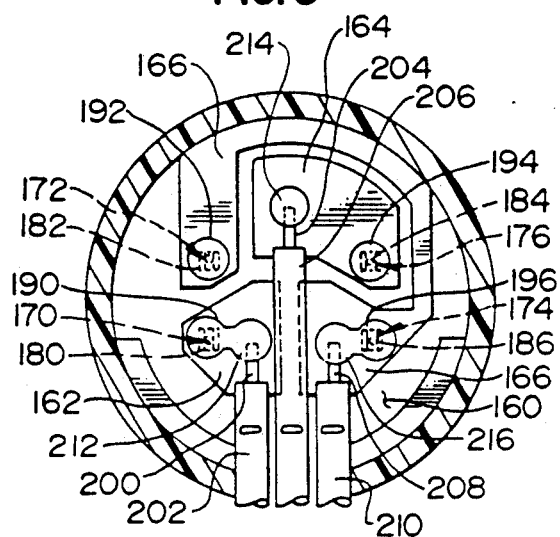
FIG. 5 is a cross-sectional view taken along line 5—5 of FIG. 2, in a direction indicated by means of the arrows.

As mentioned above, the back member 24 is made from an electrically insulative material. As shown in FIG. 5, three electrical contacts are fixed upon an outer surface 160 of the back member 24, namely a signal contact 162 for the phototransmissive device 60, a signal contact 164 for the photoreceptive device 62, and a common contact 166 for the photoelectric devices 60, 62. These electrical contacts are copper layers that may be screen-printed upon the outer surface 160.

The back member 24 has two pairs of small apertures leading from the outer surface 160 to the hollow interior of the housing structure 20, namely a first pair of such apertures 170, 172, which lead to the cavity 70 accommodating the phototransmissive device 60, and a second pair of such apertures 174, 176, which lead to the cavity 72 accommodating the photoreceptive device 62. The aperture 170 of the first pair of apertures extends through the signal contact 162. The aperture 176 of the second pair of apertures extends through the signal contact 164. The aperture 172 of the first pair of apertures and the aperture 174 of the second pair of apertures extend through the common contact 166.

The phototransmissive device 60 has a pair of electrical leads, namely a signal lead 180 extending through the aperture 170 and through the signal contact 162, and a common lead 182 extending through the aperture 172 and through the common contact 166. The photoreceptive device 62 has a pair of electrical leads, namely a signal lead 184 extending through the aperture 176 and through the signal contact 164, and a common lead 186 extending through the aperture 174 and through the common contact 166. The signal lead 180 is electrically connected to the signal contact 162 by means of a mass 190 of electrically conductive solder, which seals the aperture 170 around such lead 180 against the infiltration of contaminants. The common lead 182 is electrically connected to the common contact 166 by means of a mass 192 of such solder, which seals the aperture 172 around such lead 182 against the infiltration of such contaminants. The signal lead 184 is electrically connected to the signal contact 164 by means of a mass 194 of electrically conductive solder, which seals the aperture 176 around such lead 184 against the infiltration of contaminants. The common lead 186 is electrically connected to the common contact 166 by means of a mass 196 of such solder, which seals the aperture 174 around such lead 186 against the infiltration of such contaminants.

Three electrically conductive wires are provided, namely a signal wire 200 having an insulative sleeve 202 and associated with the phototransmissive device 60, a signal wire 204 having an insulative sleeve 206 and associated with the photoreceptive device 62, and a common wire 208 having an insulative sleeve 210 and associated with both of such devices 60, 62. As shown in FIG. 5, the signal wire 200 is electrically connected to the signal contact 162 by means of a mass 212 of electrically conductive solder, and the signal wire 204 is electrically connected to the signal contact 164 by means of a mass 214 of such solder. Likewise, the common wire 208 is electrically connected to the common contact 166 by means of a mass 216 of such solder. As shown in FIG. 5, the masses 190, 212, may coalesce and the masses 196, 216, may coalesce. Also, the masses 194, 214, may coalesce.

A cap 220 is mounted upon the back member 24. The cap 220 is molded from an engineering, polymer, which is electrically insulative, such as, for example, UL-TEM TM 2312 polyetherimide available commercially from GE Plastics, Pittsfield, Mass. The cap 220, which may be ultrasonically bonded or solvent-bonded to the back member 24, is configured so as to have opposite, wrench-engaging flats 222, 224. Moreover, the cap 220 is configured so as to cover the electrical contacts 162, 164, 166, upon the outer surface 160 of the back member 24, where the aforenoted wires 200, 204, 208, are electrically connected to such contacts 162, 164, 166. Furthermore, the cap 220 is configured so as to admit such wires 200, 204, 208, with their respective sleeves 202, 206, 210, through means of a recess 226 defined within a side wall 228 of the cap 220. The recess 226 has a scalloped edge 230, which stabilizes the insulative sleeves 202, 206, 210, of the respective wires 200, 204, 208, by bearing snugly against such sleeves 202, 206, 210, which fit respectively into concave recesses defined by means of the scalloped edge 230 and concave recesses within the back member 24. In addition, raised beads within the recesses and scallops press into the sleeves for strain relief.

As described hereinbefore, the tubular wall 40 of the back member 24 is snap-fitted into the tubular wall 26 of the front member 22 so as to permit rotational adjustment of the cap 220, the respective wires 200, 204, 208, the back member 24, the photoelectric devices 60, 62, the biasing spring 140, and the plunger 110 relative to the front member 22. The wrench-engaging flats 222, 224, of the cap 220 and the wrench-engaging flats 28 of the front member 22 facilitate such adjustment before or after the front member 22 has been mounted upon the wall 12 in the manner described hereinabove.

The switch 10 is sealed by means of the O-rings 54, 154, and by means of the solder masses 190, 192, 194, 196, against the infiltration of contaminants, such as, for example, oil mist or combustion products, whereby the switch 10 may be advantageously used as a head switch within a fastener-driving tool, as discussed hereinbefore.

Various modifications may be made in the preferred embodiment described above without departing from the scope and spirit of this invention which is defined by means of the appended claims.

We claim:

1. A photoelectric switch sealed against infiltration of contaminants, comprising:

a housing structure defining an axis of movement within said housing structure, and having a hollow interior defined within said housing structure;

photoelectric switching means mounted said hollow interior of said housing structure to define a light path between a phototransmitter and a photoreceiver of said photoelectric switching means;

a plunger having a shutter portion movably disposed within said hollow interior of said housing structure along said axis of movement between an inoperative position at which said shutter portion blocks said light path defined between said phototransmitter and said photoreceiver of said photoelectric switching means, and an operative position at which said shutter portion does not block said light path defined between said phototransmitter and said photoreceiver of said photoelectric switching means, and an actuating portion fixedly connected to said shutter portion for axial movement along with said shutter portion along said axis of movement of said housing structure and extending outwardly through a wall portion of said housing structure to be acted upon by means of a force eternal to said housing structure in order to move said shutter portion from said inoperative position to said operative position; and means defined between said axially movable actuating portion of said plunger and said wall portion of said housing structure through which said axially movable actuating portion of said plunger extends for sealing said housing structure against the infiltration of contaminants regardless of said axial movement of said actuating portion of said plunger through, and relative to, said wall portion of said housing structure.

2. A photoelectric switch as set forth in claim 1, further comprising:

annular recess means defined within an outer peripheral surface portion of said actuating portion of said plunger which is axially movable relative to an inner peripheral surface portion of said housing structure; and said sealing means comprises an O-ring, disposed within said annular recess means of said actuating portion of said plunger, for movement with said actuating portion of said plunger as said actuating portion of said plunger undergoes said axial movement relative to said housing structure to seal said housing structure against said infiltration of said contaminants.

3. A photoelectric switch as set forth in claim 1, wherein:

said housing structure comprises a first wall section having a first cavity, comprising a first portion of said hollow interior, defined therein for housing one of said phototransmitter and photoreceiver of said photoelectric switching means; and a second wall section having a second cavity, comprising a second portion of said hollow interior, defined therein for housing the other one of said phototransmitter and photoreceiver of said photoelectric switching means;

first recess means defined within said first wall section of said housing structure for permitting light to pass therethrough from said phototransmitter to said photoreceiver;

second recess means defined within said second wall section of said housing structure for permitting light to pass therethrough from said phototransmitter to said photoreceiver; and aperture means defined within said shutter portion of said plunger for alignment with said first and second recess means of said first and second wall sections of said housing structure for permitting said light to pass from said phototransmitter to said photoreceiver, through means of said first recess means of said first wall section of said housing structure, said aperture means of said shutter portion of said plunger, and said second recess means of said second wall section of said housing structure, when said shutter portion is disposed at said operative position.

4. A photoelectric switch as set forth in claim 3, wherein:

said shutter portion of said plunger has a substantially H-shaped configuration comprising a pair of laterally spaced end walls, a laterally extending wall interconnected said pair of laterally spaced end walls, and a pair of cavities respectively defined upon opposite sides of said laterally extending wall by means of said laterally extending wall and said pair of laterally spaced end walls for accommodating said first and second wall sections, and said phototransmitter and photoreceiver housed therein, when said shutter portion of said plunger is disposed at said operative position, said aperture means of said shutter portion being defined within said laterally extending wall of said shutter portion.

5. A photoelectric switch as set forth in claim 1, further comprising:

means for biasing said plunger and said shutter portion toward said inoperative position.

6. A photoelectric switch as set forth in claim 5, wherein:

said biasing means comprises a coil spring interposed between said housing structure and said plunger.

7. A photoelectric switch as set forth in claim 1, wherein:

said housing structure comprises a pair of matable housing sections; and second sealing means interposed between said pair of matable housing sections for sealing said housing structure against the infiltration of contaminants.

8. A photoelectric switch sealed against infiltration of contaminants, comprising:

a housing structure including a front member with a tubular wall and a back member with a tubular wall, each one of said tubular walls being configured to enable said tubular wall of said back member to be mechanically connected to said tubular wall of said front member, said housing structure having a hollow interior defined by means of said front and back members, and said front member having a tubular extension communicating with said hollow interior and extending axially from an external surface of an end wall of said front member in an axial direction away from said hollow interior of said housing structure;

first means for sealing said switch, interposed between said tubular walls at a location where said tubular walls are mechanically connected together, against the infiltration of contaminants;

photoelectric switching means mounted within said hollow interior of said housing structure defining a light path between a phototransmitter and a photoreceiver of said photoelectric switching means;

a plunger having a shutter portion, where a stem portion is fixedly connected to said shutter portion and extends oppositely from said shutter portion, said shutter portion being movably disposed within said hollow interior of said housing structure, said stem portion extending through and being axially movable relative to said tubular extension of said front member, said plunger being moveable between an inoperative position at which said shutter portion blocks said light path defined between said phototransmitter and said photoreceiver of said photoelectric switching means and an operative position at which said shutter portion does not block said light path defined between said phototransmitter and said photoreceiver of said photoelectric switching means, a distal end of said stem portion extending outwardly from said tubular extension of said front member to be acted upon by means of a force external to said front member of said housing structure in order to move said shutter portion of said plunger from said inoperative position to said operative position;

second means for sealing said switch, disposed around said stem portion of said plunger to be interposed between said stem portion of said plunger and said tubular extension of said front member, against the infiltration of contaminants regardless of said axial movement of said stem portion of said plunger through, and relative to, said tubular extension of said front member of said housing structure; and means for biasing said plunger toward said inoperative position.

9. The photoelectric switch of claim 8 wherein the tubular walls of the front and back members are configured so as to enable the tubular wall of one such member to be snap-fitted into the tubular wall of the other member, and to define an annular recess between the tubular walls, and wherein the first means for sealing said switch at the tubular walls against the infiltration of contaminants comprises an O-ring confined in the annular recess.

10. The photoelectric switch of claim 8 wherein the stem portion and the tubular extension define an annular recess and wherein the second means for sealing the switch around the stem portion against the infiltration of contaminants comprises an O-ring confined in the annular recess.

11. The photoelectric switch of claim 10 wherein the stem portion has an annular recess, the tubular extension has a cylindrical surface surrounding the O-ring confined in the annular recess, and the O-ring confined in the annular recess is moveable with the stem portion relative to the tubular extension.

12. The photoelectric switch of claim 8 wherein the phototransmitter and photoreceiver comprise a light-emitting diode and light-sensitive transistor.

13. The photoelectric switch of claim 12 wherein the back member is made from an electrically insulative material and has an outer surface with a plurality of electrical contacts fixed on the outer surface in spaced relation to each other and wherein the back member has two pairs of small apertures leading from the outer surface to the hollow interior, namely one pair for each of the phototransmitter and photoreceiver, and wherein each of the phototransmitter and photoreceiver has a pair of electrical leads extending through the respective apertures of the associated pair, each lead being connected electrically to a contact with electrically conductive solder, which seals the aperture around each lead against infiltration of contaminants.

14. The photoelectric switch of claim 13 further comprising
a plurality of electrically conductive wires, each wire being connected electrically to a contact, and
a cap mounted to the back member and configured to cover the contacts on the outer surface of the back member, where the respective wires are connected electrically to the respective contacts, and to admit the respective wires and provide strain relief.

15. The photoelectric switch of claim 13 wherein each contact comprises a copper layer printed on the outer surface of the back member.

16. The photoelectric switch of claim 13 wherein the tubular walls of the front and back members are configured to enable the tubular wall of member to be snap-fitted into the tubular wall of the other member, and to permit rotational adjustment of the back member, the phototransmitter and photoreceiver, the biasing means, and the plunger relative to the front member.

17. The photoelectric switch of claim 13 further comprising
a plurality of electrically conductive wires, each wire being connected electrically to a contact, and
a cap mounted to the back member and configured to cover the contacts on the outer surface of the back member, where the respective wires are connected electrically to the respective contacts to admit the respective wires and provide strain relief, and to permit rotational adjustment of the cap, the respective wires, the back member, the phototransmitter and photoreceiver photoelectric devices, the biasing means, and the plunger relative to the front member.

18. A photoelectric switch as set forth in claim 8, wherein:
said biasing means comprises a coil spring interposed between said back member of said housing structure and said plunger.

19. A photoelectric switch as set forth in claim 8, wherein:
said back member of said housing structure comprises a first wall section having a first cavity, comprising a first portion of said hollow interior, defined therein for housing one of said phototransmitter and photoreceiver of said photoelectric switch means; and a second wall section having a second cavity, comprising a second portion of said hollow interior, defined therein for housing the other one of said phototransmitter and photoreceiver devices of said photoelectric switching means;
first recess means defined within said first wall section of said back member of said housing structure for permitting light to pass therethrough from said phototransmitter to said photoreceiver;
second recess means defined within said second wall section of said back member of said housing structure for permitting light to pass therethrough from said phototransmitter to said photoreceiver; and
aperture means defined within said shutter portion of said plunger for alignment with said first and second recess means of said first and second wall sections of said back member of said housing structure for permitting said light to pass from said phototransmitter to said photoreceiver, through means of said first recess means of said first wall section of said back member of said housing structure, said aperture means of said shutter portion of said plunger, and said second recess means of said second wall section of said back member of said housing structure, when said shutter portion is disposed at said operative position.

20. A photoelectric switch as set forth in claim 19, wherein:
said shutter portion of said plunger has a substantially H-shaped configuration comprising a pair of laterally spaced end walls, a laterally extending wall interconnecting said pair of laterally spaced end walls, and a pair of cavities respectively defined upon opposite sides of said laterally extending wall by means of said laterally extending wall and said pair of laterally spaced end walls for accommodating said first and second wall sections, and said phototransmitter and photoreceiver devices housed therein, when said shutter portion of said plunger is disposed at said operative position, said aperture means of said shutter portion being defined within said laterally extending wall of said shutter portion.

* * * * *